(12) United States Patent
Castellano

(10) Patent No.: US 10,246,096 B2
(45) Date of Patent: Apr. 2, 2019

(54) METHOD AND SYSTEM FOR INCREASING ENGINE BRAKING

(71) Applicant: FORD GLOBAL TECHNOLOGIES, LLC, Dearborn, MI (US)

(72) Inventor: Javier Castellano, Hornchurch (GB)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 15/443,286

(22) Filed: Feb. 27, 2017

(65) Prior Publication Data
US 2017/0247034 A1 Aug. 31, 2017

(30) Foreign Application Priority Data

Feb. 29, 2016 (GB) .................... 1603477.9

(51) Int. Cl.
| | | |
|---|---|---|
| *B60W 30/18* | (2012.01) | |
| *B60T 1/06* | (2006.01) | |
| *B60T 8/32* | (2006.01) | |
| *B60W 40/076* | (2012.01) | |
| *B60W 50/14* | (2012.01) | |
| *B60W 10/06* | (2006.01) | |
| *B60W 10/08* | (2006.01) | |

(Continued)

(52) U.S. Cl.
CPC ....... *B60W 30/18136* (2013.01); *B60T 1/062* (2013.01); *B60T 8/3215* (2013.01); *B60W 10/06* (2013.01); *B60W 10/08* (2013.01); *B60W 10/10* (2013.01); *B60W 40/076* (2013.01); *B60W 40/1005* (2013.01); *B60W 50/14* (2013.01); *B60T 2201/04* (2013.01); *B60W 2510/0666* (2013.01); *B60W 2510/184* (2013.01); *B60W 2520/10* (2013.01); *B60W 2530/10* (2013.01); *B60W 2530/16* (2013.01); *B60W 2550/142* (2013.01); *B60W 2550/145* (2013.01); *B60W 2710/1005* (2013.01)

(58) Field of Classification Search
None
See application file for complete search history.

(56) References Cited

U.S. PATENT DOCUMENTS

| | | |
|---|---|---|
| 5,085,301 A | 2/1992 | Imamura et al. |
| 5,816,979 A | 10/1998 | Shiiba et al. |
| 6,231,480 B1 | 5/2001 | Sasaki |

(Continued)

FOREIGN PATENT DOCUMENTS

| | | |
|---|---|---|
| GB | 2523085 A | 8/2015 |
| WO | 2012042341 A1 | 4/2012 |

OTHER PUBLICATIONS

Combined Search and Examination Report under Sections 17 and 18(3) in corresponding International Patent Application No. GB1603477.9 dated Aug. 15, 2016, 5 pages.

*Primary Examiner* — Justin Holmes
(74) *Attorney, Agent, or Firm* — James Dottavio; Brooks Kushman P.C.

(57) ABSTRACT

A method of increasing engine braking of an engine for a vehicle, the method including: determining the change in kinetic energy of the vehicle over a period; determining the energy output from a drivetrain of the vehicle over the period; comparing the change in kinetic energy to the energy output; and increasing the engine braking of the vehicle when the change in kinetic energy is greater than the energy output over the period.

18 Claims, 2 Drawing Sheets

(51) Int. Cl.
*B60W 10/10* (2012.01)
*B60W 40/10* (2012.01)

(56) References Cited

U.S. PATENT DOCUMENTS

| | | | |
|---|---|---|---|
| 8,165,764 B2 | 4/2012 | Wolfgang et al. | |
| 8,948,982 B2* | 2/2015 | Elliott | E02F 9/2253 |
| | | | 701/50 |
| 2011/0125376 A1* | 5/2011 | Chappell | B60W 10/06 |
| | | | 701/65 |
| 2014/0114553 A1* | 4/2014 | Abdul-Rasool | B60W 10/02 |
| | | | 701/110 |
| 2015/0191171 A1 | 7/2015 | Hasan Pour Arbastan et al. | |
| 2016/0297445 A1* | 10/2016 | Bjernetun | B60W 30/18072 |

\* cited by examiner

METHOD AND SYSTEM FOR INCREASING ENGINE BRAKING

CROSS-REFERENCE TO RELATED APPLICATIONS

This application claims foreign priority benefits under 35 U.S.C. § 119(a)-(d) to GB Application 1603477.9 filed Feb. 29, 2016, which is hereby incorporated by reference in its entirety.

TECHNICAL FIELD

This disclosure relates to a method and a system for increasing the engine braking of an engine for a vehicle and in particular, but not exclusively, relates to method and a system for increasing the engine braking of an engine for a vehicle when it is determined that the vehicle is travelling downhill.

BACKGROUND

It is common for the driver of a vehicle to select a higher gear in order to optimise the fuel economy of the vehicle. Where the vehicle has an automatic transmission, a control unit of a vehicle can be configured to select an appropriate gear based on the speed of the vehicle and the driver's torque demand. The control unit will typically use an algorithm to optimise fuel economy, vehicle performance, or a combination of them both.

During an extended downhill decent, for example on a mountain road, the torque demand from the driver is usually very low. As a result, the control unit of the automatic transmission will select a high gear to optimise the fuel economy of the vehicle. However, the high gear selected by the control unit results in a low level of engine braking. The driver must therefore rely on the vehicle's brakes to decelerate the vehicle during the extended downhill decent.

Such use of the brakes may cause the brake pads of the brakes to wear out faster, which would lead to more frequent brake pad replacement. Furthermore, heavy use of the brakes during an extended downhill decent may lead to degradation of braking performance.

SUMMARY

According to an aspect of the present disclosure there is provided a method of increasing engine braking of an engine for a vehicle, the method comprising: determining the change in kinetic energy of the vehicle over a period; determining the energy output from a drivetrain of the vehicle over the said period; comparing the change in kinetic energy to the energy output; and increasing the engine braking of the vehicle when the change in kinetic energy is greater than the energy output over the said period.

In the context of the present disclosure, the term "engine braking" refers to when the retarding forces within an engine are used to slow a vehicle down, as opposed to using an additional external braking system, such as friction brakes. However, in the context of modern vehicles, the term "engine braking" may apply to any appropriate braking applied to the drivetrain of the vehicle, for example braking applied by an electric machine of a hybrid vehicle.

The method may comprise initiating, for example performing, a downshift of a transmission of the vehicle to increase the engine braking, for example when the change in kinetic energy is greater than the energy output over the said period. The transmission may be a manual transmission. The transmission may be an automatic transmission. The method may comprise causing the automatic transmission of the vehicle to downshift. The method may comprise providing an indication to the driver of the vehicle to initiate a downshift of the transmission. The method may comprise activating an electric machine coupled to a drivetrain of the vehicle in order to increase engine braking.

The method may comprise determining the energy required to overcome the rolling resistance of the vehicle over the said period. The energy required to overcome the rolling resistance of the vehicle over the said period may be determined by integrating the power required to overcome the rolling resistance of the vehicle over the said period. The method may comprise comparing the energy output to the energy required to overcome the rolling resistance of the vehicle. The method may comprise increasing the engine braking of the vehicle when the change in kinetic energy plus the energy required to overcome the rolling resistance of the vehicle over the said period the is greater than the energy output from a drivetrain of the vehicle over the period.

The method may comprise determining the energy required to overcome the drag of the vehicle over the said period. The energy required to overcome the drag of the vehicle over the said period may be determined by integrating the power required to overcome the drag of the vehicle over the said period. The method may comprise comparing the energy output to the energy required to overcome the drag of the vehicle over the said period. The method may comprise increasing the engine braking of the vehicle when the change in kinetic energy over the said period is greater than the energy output from a drivetrain of the vehicle minus the energy required to overcome the drag of the vehicle over the period.

The method may comprise estimating the change in potential energy of the vehicle using at least one of: the determined change in kinetic energy of the vehicle over the said period; the determined energy output from a drivetrain of the vehicle over the said period; the determined energy required to overcome the rolling resistance of the vehicle over the said period; and the determined energy required to overcome the drag of the vehicle over the said period.

The method may comprise determining the inclination of the vehicle using one or more sensors. The method may comprise determining the altitude of the vehicle using one or more sensors. The method may comprise determining the potential energy of the vehicle, for example determining the change in the potential energy of the vehicle over the said period. The method may comprise corroborating that the vehicle is travelling downhill by comparing the estimated change in potential energy and the change in potential energy of the vehicle determined by the one or more sensors. The method may comprise overriding the downshift of the transmission in response to a failure to corroborate that the vehicle is travelling downhill.

The method may comprise determining the energy input into a brake system of the vehicle. The method may comprise increasing the level of engine braking when, for example only when, the temperature of the brake system is greater than a predetermined temperature. The method may comprise overriding increasing the engine braking in response to one or more engine protection parameters.

The period may be any appropriate period over which the above determinations/calculations may be performed by a controller of the vehicle. The said period may be in the range of approximately 0.5 seconds to 10 seconds. The said period may be greater than approximately 60 seconds. For example, the method according to the present disclosure may be implemented when the vehicle is in an extended downhill drive, such as when the vehicle is descending a mountain road.

The method may comprise determining an average kinetic energy of the vehicle over the said period. The method may comprise determining an average energy supplied to the drivetrain of the vehicle over the said period. The method may comprise comparing the average kinetic energy to the average energy supplied to the drivetrain. The method may comprise increasing the engine braking of the vehicle when the average kinetic energy of the vehicle is greater than the average energy supplied to the drivetrain over the said period.

According to another aspect of the present invention there is provided a system for increasing engine braking of an engine for a vehicle, the system comprising a controller configured to: determine the change in kinetic energy of the vehicle over a period; determine the energy output from a drivetrain of the vehicle over the said period; compare the change in kinetic energy to the energy output; and cause an increase in the amount of engine braking when the change in kinetic energy is greater than the energy output over the said period.

The disclosure also provides software, such as a computer program or a computer program product for carrying out any of the methods described herein, and a computer readable medium having stored thereon a program for carrying out any of the methods described herein. A computer program embodying the disclosure may be stored on a computer-readable medium, or it could, for example, be in the form of a signal such as a downloadable data signal provided from an Internet website, or it could be in any other form.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

For a better understanding of the present disclosure, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When a vehicle such as a car, a van, a truck, or a motorcycle is travelling downhill, the power output from a drivetrain of the vehicle will be low since the vehicle's motion is assisted by gravity. As a result, there is a low torque demand on the engine and a higher gear of a transmission of the vehicle may be selected in order to improve fuel economy.

Figure 1:
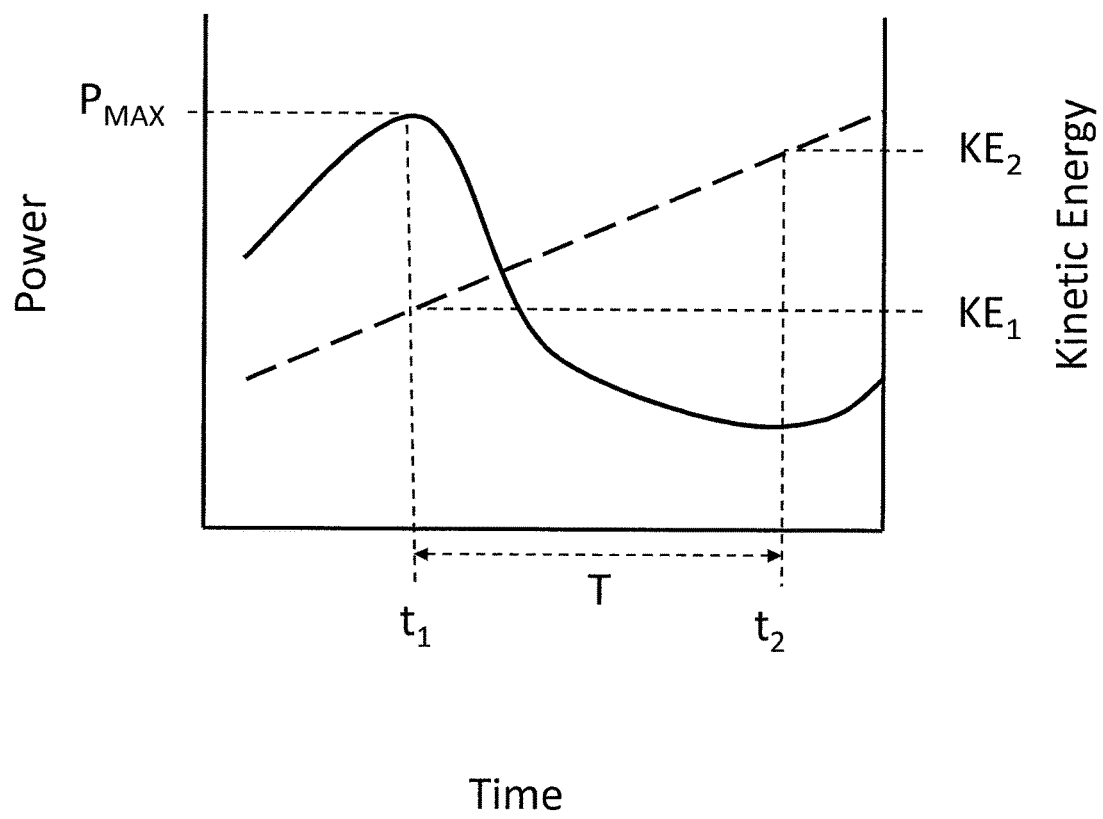
FIG. 1 shows a graphical representation of the power output of a vehicle against time and the kinetic energy of the vehicle against time.
Figure 2:
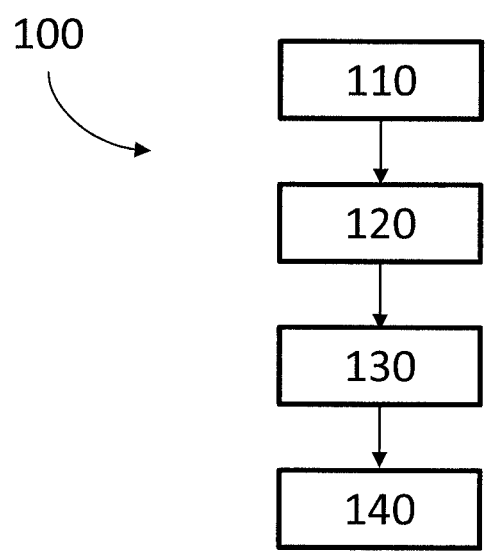
FIG. 2 shows a method of increasing engine braking.

FIG. 1 shows the power output from the drivetrain of the vehicle against time. The power output may increase, decrease or remain constant depending on the driving conditions and/or the torque requested by the driver. For example, when the vehicle is driving up an incline and/or when the vehicle accelerates, the level of power output may increase as requested by the driver. When the vehicle starts to descend, the driver may decrease the level of requested torque, and as a result the power output from the engine decreases. Where the vehicle is fitted with an automatic transmission, a controller of the transmission may cause the transmission to up-shift in an attempt to improve fuel economy. In such circumstances, the level of engine braking is reduced due to the longer gearing, and the driver may have to use a braking system of the vehicle more frequently to decelerate the vehicle during the downhill decent. Increased usage of the braking system during a downhill decent may lead to overheating of the brakes and degradation of braking performance.

The present disclosure provides a method 100 of increasing engine braking of the engine of the vehicle, for example during an extended period of downhill decent. An increase in the level of engine braking enables a reduction in the usage of the braking system of the vehicle, which can help to maintain the performance of the braking system, for example by reducing the amount of heat generated by the braking system during the downhill decent. Further, the present disclosure provides a method 100 of determining if the vehicle is travelling downhill without the use of a system configured to determine the location, altitude and/or inclination of the vehicle. Instead, the method 100 is able to determine whether the vehicle is travelling downhill based solely on the operational parameters of the vehicle.

In the context of the present disclosure, the term "extended downhill" is understood to mean a period of downhill decent of sufficient length and/or angle of declination that the performance of the braking system may be adversely affected as a result of the level of usage of the braking system. For example, extended downhill driving conditions may be experienced when descending a mountain road. During a downhill decent, an up-shift of the transmission may be carried out upon determining a reduction in the power output of the engine. The period of downhill decent may be in the range of approximately 0.5 to 10 seconds, or may be substantially longer depending on the length of the downhill portion of the road. However, the method may be implemented in any appropriate downhill driving condition and/or over any appropriate period. For example, the period may be limited only by the time taken for a controller of the vehicle to process data regarding the operational parameters of the engine and/or vehicle.

The method 100 comprises determining the kinetic energy KE of the vehicle. More specifically, the method comprises a step 110 of determining the change in kinetic energy $\Delta KE$ of the vehicle over a period T, for example a period in the range of approximately 0.5 to 10 seconds. The kinetic energy of the vehicle can be determined using equation 1 below, in which m denotes the mass of the vehicle and v denotes the speed of the vehicle. The change in kinetic energy of the vehicle can be determined by calculating the kinetic energy of the vehicle over the period T, for example using equation 2, which demonstrates that the change in kinetic energy of the vehicle may be the difference between the kinetic energy $KE_{t1}$ of the vehicle at a first time $t_1$ and the kinetic energy $KE_{t2}$ of the vehicle at a second time $t_2$.

$$KE = \tfrac{1}{2}mv^2 \quad (1)$$

$$\Delta KE(dt) = KE_{t2} - KE_{t1} \quad (2)$$

The method 100 comprises determining the energy output from a drivetrain of the vehicle over the period T The energy output from the drivetrain may be determined by integrating the power output from the drivetrain over the period T The power output of the drivetrain may be calculated using direct measurements of the operational parameters of the drivetrain of the vehicle, for example measurement of the torque and the rotational speed of an output shaft of the engine. Additionally or alternatively, data regarding the power output of the drivetrain may be available from a data library, for example an engine performance map, stored on a controller of the vehicle. The power output may be determined at discrete time intervals by recalling power values from the data library that correspond to the instantaneous operational parameters of the drivetrain of the vehicle.

In an example where the vehicle is travelling on level terrain, for example terrain that does not have any substantial incline or decline, and neglecting any losses or external forces acting on the vehicle, the change in kinetic energy of the vehicle over the period T is equal to the energy output from the drivetrain of the vehicle over the said period T The method 100 comprises comparing the change in kinetic energy to the energy output from the drivetrain.

In another example where the vehicle is ascending or descending, and neglecting any losses or external forces acting on the vehicle, the change in kinetic energy of the vehicle over the period T will be different from the energy output from the drivetrain of the vehicle over the said period T For example, where the vehicle is ascending or descending on a mountain road, the change in kinetic energy of the vehicle will be a function of the energy output from the drivetrain of the vehicle and the change in potential energy PE of the vehicle, as shown by equation 3.

$$\Delta KE(dt) \approx f(\Delta PE(dt), \int P_{OUTPUT}(dt)) \quad (3)$$

In those situations where the change in kinetic energy is not equal to the energy output from the drivetrain of the vehicle, it can be inferred that the potential energy of the vehicle has changed and thus the vehicle is not travelling on level terrain. More specifically, if the change in kinetic energy of the vehicle over the period T is greater than the energy output from the drivetrain of the vehicle over the period T, as shown by equation 4, it can be inferred that the vehicle is travelling downhill. Moreover, the change in potential energy of the vehicle may be estimated by calculating the difference between the change in kinetic energy and the energy output from the drivetrain of the vehicle over the period T.

$$\Delta KE(dt) > \int P_{OUTPUT}(dt) \quad (4)$$

With reference to FIG. 1, the method 100 comprises: the step 110 determining the change in kinetic energy of the vehicle between times $t_1$ and $t_2$; the step 120 of determining the energy output from a drivetrain of the vehicle between times $t_1$ and $t_2$; and the step 130 of comparing the change in kinetic energy of the vehicle between times $t_1$ and $t_2$ to the energy output from a drivetrain of the vehicle between times $t_1$ and $t_2$. Where the change in kinetic energy is greater than the energy output from the drivetrain between time $t_1$ and $t_2$, as shown in equation 5, the method 100 comprises a step 140 of performing a downshift of a transmission of the vehicle. The step 140 may be carried out only if the difference between kinetic energy and the energy output from the drivetrain is greater than a predetermined value, for example only if the kinetic energy is approximately 120% of the energy output from the drivetrain.

$$(KE_{t2} - KE_{t1}) > \int_{t_1}^{t_2} P_{OUTPUT} dt \quad (5)$$

The present disclosure provides a method 100 of increasing the level of engine braking so that the driver need not rely as much on the braking system of the vehicle to decelerate the vehicle during periods of downhill decent, for example extended downhill driving conditions. As a result, the operating temperature of the brake pads of the braking system can be maintained at a lower temperature, which helps to prevent loss of braking performance to ensure adequate braking performance in an emergency situation.

In another example, the change in kinetic energy of the vehicle may be a function of the energy output from the drivetrain of the vehicle over the period, the change in potential energy of the vehicle over the period, the energy required to overcome the rolling resistance of the vehicle over the period and/or the energy required to overcome the drag of the vehicle over the period, as shown by equation 6. As such, the method 100 may comprise a step of determining the energy required to overcome the rolling resistance of the vehicle over the period T and/or a step of determining the energy required to overcome the drag of the vehicle over the period T The energy required to overcome the rolling resistance of the vehicle may be determined by integrating the amount of power $P_{RR}$ used in overcoming the rolling resistance over the period T. In a similar manner, energy required to overcome the drag of the vehicle may be determined by integrating the amount of power $P_D$ used in overcoming the drag over the period T $$\Delta KE(dt) \approx f(\int P_{OUTPUT}(dt), \Delta PE(dt), \int P_D(dt), \int P_{RR}(dt)) \quad (6)$$

The instantaneous rolling resistance power $P_{rr}$ can be determined using equation 7, where $C_{RR}$ is the dimensionless rolling resistance coefficient, N is the normal force, i.e. the force perpendicular to the surface on which a wheel of the vehicle is rolling, and v is the velocity of the vehicle relative to the road. The instantaneous drag power $P_D$ can be determined using equation 8, where $\rho$ is the density of the air surrounding the vehicle, $C_D$ is the dimensionless drag coefficient, A is the cross sectional area of the vehicle, and v is the velocity of the vehicle relative to the air.

$$P_{RR} = C_{RR} N v \quad (7)$$

$$P_D = \tfrac{1}{2} \rho C_D A v^3 \quad (8)$$

Where the method 100 comprises determining the energy required to overcome the rolling resistance and/or the energy required to overcome the drag of the vehicle, these factors may be considered when comparing the change in kinetic energy to the energy output from the drivetrain between time $t_1$ and $t_2$, as shown in equation 9. The method 100 may comprise the step of performing a downshift of a transmission of the vehicle when the sum of: the change in the kinetic energy of the vehicle between time $t_1$ and $t_2$; the energy required to overcome the rolling resistance of the vehicle between time $t_1$ and $t_2$; and the energy required to overcome the drag of the vehicle between time $t_1$ and $t_2$ is greater than the energy output from a drivetrain of the vehicle between times $t_1$ and $t_2$. In this manner, the amount of engine braking produced by the drivetrain of the vehicle may be increased when it is determined that the vehicle is travelling downhill.

$$\Sigma((KE_{t_2}-KE_{t_1})+\int_{t_1}^{t_2}(C_{RR}Nv)dt+\int_{t_1}^{t_2}(½\rho C_D Av^3)dt)>\int_{t_1}^{t_2} P_{OUTPUT} dt \quad (9)$$

The method 100 may comprise determining the altitude and/or inclination of the vehicle using one or more sensors. For example, the vehicle may be fitted with a global positioning satellite (GPS) system that is configured to determine position and/or altitude of the vehicle. The method 100 may comprise determining the change in potential energy of the vehicle over the period T using altitude data derived by the GPS system. The change in the potential energy of the vehicle may be calculated using equation 10, where m is the mass of the vehicle, g is the gravitational constant and $\Delta h$ is the change in altitude of the vehicle, for example the altitude of the vehicle at time $t_1$ and the altitude of the vehicle at time $t_2$. In this manner, the change in potential energy of the vehicle can be calculated for the period T.

$$\Delta PE = mg\Delta h(dt) \quad (10)$$

The method may comprise a step of estimating the change in potential energy of the vehicle based on the determined: change in the kinetic energy of the vehicle between time $t_1$ and $t_2$; energy required to overcome the rolling resistance of the vehicle between time $t_1$ and $t_2$; energy required to overcome the drag of the vehicle between time $t_1$ and $t_2$; and energy output from a drivetrain of the vehicle between times $t_1$ and $t_2$. For example, the change in potential energy of the vehicle may be estimated using equation 11.

$$(PE_{t_2}-PE_{t_1}) \approx \Sigma(\int_{t_1}^{t_2} P_{OUTPUT}dt - \int_{t_1}^{t_2}(½\rho C_D Av^3)dt - \int_{t_1}^{t_2}(C_{RR}Nv)dt - (KE_{t_2}-KE_{t_1})) \quad (11)$$

The method 100 may comprise a step of comparing the change in potential energy determined using equation 10, i.e. by virtue of the one or more sensors, against the estimated change in potential energy determined using equation 11. The method may comprise the step of corroborating that the vehicle is travelling downhill using the comparison between change in potential energy determined using equation 10 against the estimated change in potential energy determined using equation 11. In this manner, the estimated change in potential energy determined using equation 11 can be used to determine if the GPS system is functioning correctly. Further, the comparison between change in potential energy determined using equation 10 against the estimated change in potential energy determined using equation 11 can be used to indicate if the rolling resistance power and/or the drag power of the vehicle is unexpectedly high, for example when the change in potential energy determined using equation 10 is less than the estimated change in potential energy determined using equation 11.

Where the derived values for the change in potential energy determined using equation 10 and the estimated change in potential determined using equation 11 are different, the method 100 may comprise a step of over-riding the downshift of the transmission of the vehicle, since the discrepancy between the values may indicate a problem with one or more of the vehicular system, such as a flat tyre and or a deployed air brake/spoiler.

The method 100 may comprise determining the energy input into the braking system of the vehicle, for example the method 100 may comprise determining the temperature of the brake pads of the braking system. The method 100 may comprise a step of performing the downshift of the transmission of the vehicle only when the temperature of the brake system is greater than a predetermined temperature. In this manner, the system for increasing engine braking may only be activated when it is recognised that the operational efficacy of the braking system is at risk, for example during driving conditions that require the driver to make heavy use of the braking system of the vehicle.

It will be appreciated by those skilled in the art that although the disclosure has been described by way of example with reference to one or more examples, it is not limited to the disclosed examples and that alternative examples could be constructed without departing from the scope of the disclosure as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of increasing engine braking of an engine for a vehicle, the method comprising:
   determining a change in kinetic energy of the vehicle over a period;
   determining an energy output from a drivetrain of the vehicle over the period;
   comparing the change in kinetic energy to the energy output;
   increasing engine braking of the vehicle when the change in kinetic energy is greater than the energy output over the period;
   determining an energy input into a brake system of the vehicle; and
   increasing the engine braking of the vehicle when a temperature of the brake system is greater than a predetermined temperature.

2. The method of claim 1 further comprising:
   determining an energy required to overcome rolling resistance of the vehicle over the period;
   comparing the energy output to the energy required to overcome the rolling resistance of the vehicle; and
   increasing the engine braking of the vehicle when the change in kinetic energy over the period is greater than the energy output from the drivetrain of the vehicle minus the energy required to overcome the rolling resistance of the vehicle over the period.

3. The method of claim 1 further comprising:
   determining an energy required to overcome drag of the vehicle over the period;
   comparing the energy output to the energy required to overcome the drag of the vehicle over the period; and
   increasing the engine braking of the vehicle when the change in kinetic energy over the period is greater than the energy output from the drivetrain of the vehicle minus the energy required to overcome the drag of the vehicle over the period.

4. The method of claim 1 further comprising determining an inclination of the vehicle using one or more sensors.

5. The method of claim 1 further comprising determining the altitude of the vehicle using one or more sensors.

6. The method of claim 5 further comprising corroborating that the vehicle is travelling downhill using one or more of the sensors.

7. The method of claim 6 further comprising overriding a downshift of a transmission in response to a failure to corroborate that the vehicle is travelling downhill.

8. The method of claim 1 further comprising providing an indication to a driver of the vehicle to perform a manual downshift of the transmission when the change in kinetic energy is greater than the energy output over the period.

9. The method of claim 1 wherein the period is greater than 60 seconds.

10. The method of claim 1 further comprising determining an inclination of the vehicle using one or more sensors.

11. The method of claim 1 further comprising determining the altitude of the vehicle using one or more sensors.

12. The method of claim 11 further comprising corroborating that the vehicle is travelling downhill using one or more of the sensors.

13. A method of increasing powertrain braking comprising:
   determining a change in kinetic energy of a vehicle over a period;
   determining an energy output from a powertrain of the vehicle over the period;
   comparing the change in kinetic energy to the energy output; and
   increasing powertrain braking of the vehicle, by activating an electric machine of the powertrain, when the change in kinetic energy is greater than the energy output over the period.

14. The method of claim 13 wherein an increase in powertrain braking is caused by a downshift of a transmission of the powertrain.

15. The method of claim 14, wherein the transmission is an automatic transmission.

16. A system for increasing engine braking of an engine for a vehicle, the system comprising a controller configured to:
   determine a change in kinetic energy of the vehicle over a period;
   determine an energy output from a drivetrain of the vehicle over the period;
   compare the change in kinetic energy to the energy output;
   increase engine braking of the vehicle when the change in kinetic energy is greater than the energy output over the period;
   determining an energy input into a brake system of the vehicle; and
   increasing the engine braking of the vehicle when a temperature of the brake system is greater than a predetermined temperature.

17. The method of claim 16 further comprising:
   determining an energy required to overcome rolling resistance of the vehicle over the period;
   comparing the energy output to the energy required to overcome the rolling resistance of the vehicle; and
   increasing the engine braking of the vehicle when the change in kinetic energy over the period is greater than the energy output from the drivetrain of the vehicle minus the energy required to overcome the rolling resistance of the vehicle over the period.

18. The method of claim 16 further comprising:
   determining an energy required to overcome drag of the vehicle over the period;
   comparing the energy output to the energy required to overcome the drag of the vehicle over the period; and
   increasing the engine braking of the vehicle when the change in kinetic energy over the period is greater than the energy output from the drivetrain of the vehicle minus the energy required to overcome the drag of the vehicle over the period.

* * * * *